(No Model.)
H. S. CARHART.
STANDARD CELL FOR ELECTRIC BATTERIES.
No. 485,089. Patented Oct. 25, 1892.
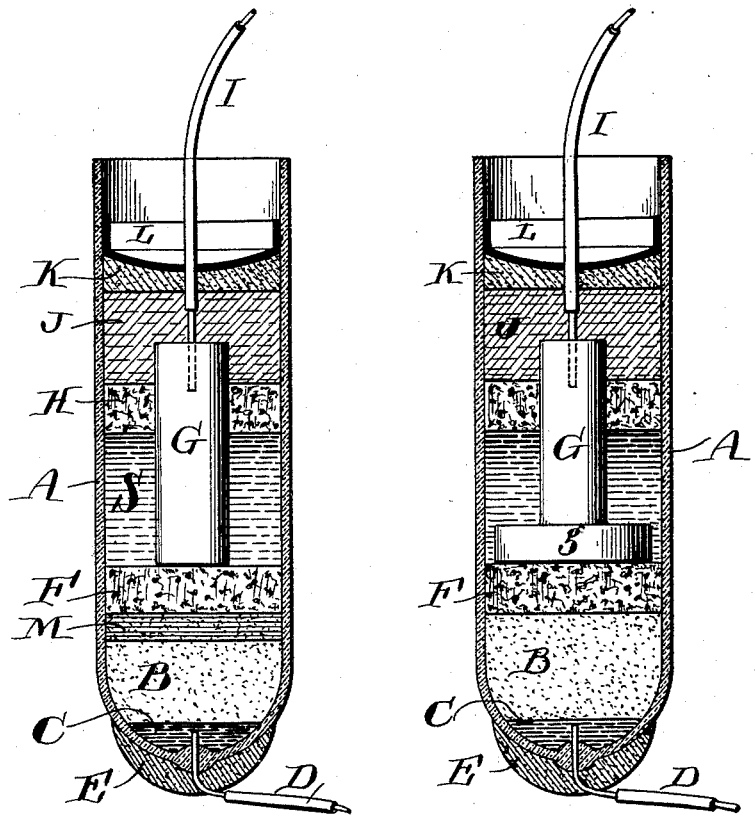
FIG. 1.    FIG. 2.
WITNESSES:    INVENTOR:

UNITED STATES PATENT OFFICE.

HENRY S. CARHART, OF ANN ARBOR, MICHIGAN.

STANDARD CELL FOR ELECTRIC BATTERIES.

SPECIFICATION forming part of Letters Patent No. 485,089, dated October 25, 1892.

Application filed July 11, 1892. Serial No. 439,591. (No model.)

*To all whom it may concern:*

Be it known that I, HENRY S. CARHART, of Ann Arbor, in the county of Washtenaw and State of Michigan, have invented an Improvement in Standard Cells for Electric Batteries, of which the following is a specification.

My invention has reference to certain improvements in the manufacture of standard cells for electric batteries; and it consists of certain improvements which are fully set forth in the following specification, and shown in the accompanying drawings, which form a part thereof.

My improvement has special reference to the method of construction of a cell whereby it may have a low-temperature coefficient, a constant electro-motive force, and be excellently adapted to long use and transportation without deterioration.

The well-known standard cell invented by Latimer Clark, of England, has been before the public since 1873; but its use has been greatly limited, owing to the following defects: First, its construction was such that it would not endure transportation because of the mixing up of the contents of the cell, causing short-circuiting and initiating chemical action fatal to the use of the cell; second, it was subject to more or less local action, which limited the life of the cell, and, third, its change of electro-motive force with temperature, technically called its "temperature coefficient," is large and apparently variable.

The object of my invention is to overcome these objections and in addition thereto secure a sealing of the cell that will withstand changes of temperature and avoid loss of the liquid contents of the cell by capillary action and evaporation.

The essential elements of the cell are an internal platinum terminal usually, though not necessarily, in contact with pure mercury, mercurous sulphate, a solution of chemically-pure zinc sulphate, and metallic zinc. The combination of these elements will be more fully explained hereinafter.

In the original Latimer Clark cell, as well as in later forms, the zinc is immersed not only in the zinc-sulphate solution, but is also in contact with the mercurous sulphate. Furthermore, the zinc-sulphate solution used prior to my invention was saturated at 20° or 30° centigrade and the excess crystallized out on cooling below this temperature. The density of the solution was thus dependent upon the temperature of the cell at the time. I have found that an increase of density of the zinc-sulphate solution causes a decrease of electro-motive force. A rise of temperature diminishes the electro-motive force, and hence the so-called "temperature coefficient" of ordinary Clark cells includes an objectionable change in electro-motive force due to two distinct causes—one depending upon heat directly and the other upon the heat indirectly—causing a change of density due to crystallization as a secondary effect. These difficulties I have overcome by employing a solution saturated at a temperature lower than any at which the cell is to be used. I have preferably employed a solution saturated at the temperature of melting ice and have by this means reduced the temperature coefficient to about one-half its former value. A lower temperature may be employed, if desired, or in fact any temperature may be employed so long as it is below that at which the cell is to be used. To prevent local action, I do not let the zinc come into contact with the mercurous sulphate. I thus effectually prevent all local action, so that the cell remains in better condition and has a longer life. For the purpose of separating the zinc from the mercury salt, as well as to prevent mixing of the contents of the cell during transportation, I place a porous partition or diaphragm on the top of the mercurous sulphate. This partition I usually make of prepared cork, but sometimes of fine white felt. It effectually holds down the mercury salt and the mercury and keeps the zinc in the clear electrolytic solution of zinc sulphate. To fill up any space occupied by the liquid after the mercury salt has settled down, I have found it of great advantage to use purified asbestus under the cork. Some other neutral substance as an equivalent may be used. To secure a perfect seal, I have found it completely satisfactory to use a combination consisting first of a compound of gutta-percha and pitch poured on hot, and on top of this I place a paste made of zinc oxide and silicate of sodium or soluble glass. After this has been hardened I finish the seal with a layer of silicate of sodium. The silicate attaches itself so firmly to the glass tube that no zinc sulphate comes through along the glass by capillary action.

In the drawings, Figure 1 is a sectional elevation of my preferred form of cell, and Fig. 2 is a similar view of a modification.

A is a glass tube or vessel closed on the bottom and preferably similar to a small test-tube.

B is the mercurous sulphate or other mercury salt, and C may be a small amount of mercury at the bottom of the cell.

D is one terminal wire and enters the bottom of the tube or vessel A, so as to be in contact with the mercury C. The wire D is hermetically sealed in the glass, and the wire adjacent to its entrance in the glass may be covered with wax E to prevent it readily breaking off.

F is a packing-disk of porous material. (Shown as cork in Fig. 1 and white felt in Fig. 2.)

G is the zinc and is of less diameter than the glass tube. The bottom of the zinc is kept out of contact with the mercury salt by the cork or felt. If desired, purified asbestus may be used in place of either cork or felt. Any inert porous material may be used adapted to the purpose.

S represents a saturated solution of zinc sulphate, as the electrolyte which surrounds the zinc G, and is made at a temperature below that at which the cell will be used. A suitable temperature is that of melting ice.

H is an annular disk of cork, which is inert and may bind upon the zinc and inside of the glass tube to hold the parts in place. Of course any other suitable material—such as felt or asbestus—may be used in place of cork H.

I is the other terminal and connects with the zinc.

J is a sealing mixture of gutta-percha and pitch, which is poured on hot and adheres to the glass, cork, zinc, and wire. Over this is placed a layer K of a mixture of zinc oxide and silicate of sodium, and again over this I place a wash of silicate of sodium or liquid glass, as at L, which adheres to the glass and everything it touches, preventing capillary action of the zinc sulphate between the glass and gutta-percha compound. The cell is thus hermetically sealed.

In place of silicate of sodium and zinc oxide I may use silicate of potassium and zinc oxide to form the sealing-paste which is applied upon the wax formed of the gutta-percha and pitch. It is also evident that any other non-conducting adhesive wax substance may be used in place of the mixture of gutta-percha and pitch, although I prefer the latter as being excellently adapted to the purpose.

If desired, purified asbestus or other absorbent material M may be placed under the porous diaphragm of cork or other material F to fill the space after the mercurous salt has settled down. It will prevent the mercury and mercurous salt becoming mixed or shaken up in handling or when the cell is being shipped or transported.

As shown in Fig. 2, the bottom of the zinc G is of larger diameter, as at $g$, for the purpose of holding down the diaphragm; but this enlarged part $g$ may be dispensed with, as in case of Fig. 1, if so desired.

I do not confine myself to the minor details herein set out, as they may be somewhat modified without departing from the principles of my invention.

Having now described my invention, what I claim as new, and desire to secure by Letters Patent, is—

1. In a standard cell, the combination of a vessel, a mercury salt therein connecting with one terminal of the cell, a zinc element connecting with the other terminal, an electrolytic fluid in contact with the zinc and mercury salt, and a porous partition or diaphragm between the zinc and mercury salt.

2. In a standard cell, the combination of a vessel, a mercury salt and mercury therein connecting with one terminal of the cell, a zinc element connecting with the other terminal, an electrolytic fluid in contact with the zinc and mercury salt, a porous partition or diaphragm between the zinc and mercury salt, and an absorbent and neutral substance arranged below the porous partition or diaphragm to prevent the mercury salt shifting its position in the vessel and becoming mixed with the mercury.

3. In a standard cell, the combination of a vessel, a mercury salt at the bottom, a wire terminal electrically connected with said salt, a zinc element arranged within the vessel above the mercury salt, a porous inert or neutral diaphragm between the zinc and mercury salt, an electrolyte surrounding the zinc, a sealing-diaphragm arranged above the electrolyte to hold the zinc in place, a terminal-wire leading from the zinc, and an impervious sealing material arranged above the zinc and sealing-diaphragm adapted to adhere closely to the vessel.

4. In a standard cell, the combination of a vessel, a mercury salt at the bottom, a wire terminal electrically connected with said salt, a zinc element arranged within the vessel above the mercury salt, a porous inert or neutral diaphragm between the zinc and mercury salt, an electrolyte surrounding the zinc, a sealing-diaphragm arranged above the electrolyte to hold the zinc in place, a terminal wire leading from the zinc, and an impervious sealing material consisting of gutta-percha and pitch arranged above the zinc and sealing-diaphragm, and an outer covering of zinc oxide and alkaline silicate adapted to adhere closely to the vessel.

5. In a standard cell, the combination of a glass vessel, a mercury salt and zinc as elements, an electrolyte, a sealing-diaphragm, a sealing material consisting of zinc oxide and alkaline silicate, and a covering of alkaline silicate alone above said sealing material to adhere to the glass and prevent the zinc sulphate creeping up the glass by capillary action.

6. A standard cell having its elements and electrolyte sealed in a vessel by a compound consisting of a neutral non-conducting adhesive wax and a paste of a silicate of an alkali and zinc oxide.

7. The herein-described method of constructing a standard cell having a low temperature coefficient, which consists in forming a saturated solution of zinc sulphate at a lower temperature than that at which the cell is to be used and sealing the said saturated solution of zinc sulphate in a vessel in contact with a mercury salt and metallic zinc contained within the cell.

8. The herein-described method of constructing a standard cell having a low temperature coefficient, which consists in forming a saturated solution of zinc sulphate at a temperature lower than any at which the cell will be used and sealing the said saturated solution of zinc sulphate in a vessel in contact with a salt and a metal contained within the cell.

9. The herein-described method of constructing a standard cell having a low temperature coefficient, which consists in forming a saturated solution of an electrolyte at a temperature lower than that at which the cell will be used and sealing the said electrolyte in a vessel in contact with the elements of the cell.

In testimony of which invention I have hereunto set my hand.

HENRY S. CARHART.

Witnesses:
F. A. SOULÉ,
E. F. MILLS.